United States Patent Office 3,813,457
Patented May 28, 1974

---

3,813,457
PREPARATION OF N-UNSUBSTITUTED (THIONO)-(THIOL)-PHOSPHORIC(PHOSPHONIC) ACID O-ESTER MONO-AMIDES
Reimer Colln, Wuppertal-Elberfeld, Germany, assignor to Bayer Aktiengesellschaft, Leverkusen, Germany
No Drawing. Filed July 10, 1972, Ser. No. 270,390
Claims priority, application Germany, July 15, 1971, P 21 35 349.1
Int. Cl. C07f 9/24
U.S. Cl. 260—971
10 Claims

ABSTRACT OF THE DISCLOSURE

A process for the preparation of an N-unsubstituted phosphoric or phosphonic acid O-ester mono-amide, or the corresponding thiono, thiol or thionothiol O-ester mono-amide, which comprises contacting at a temperature of about −10 to 70° C. the corresponding N-unsubstituted phosphoric or phosphonic acid diamide with at least an equivalent amount of an alcohol in the presence of an approximately equivalent amount of a strong mineral acid.

The strong acid preferably is hydrogen chloride which may be added by bubbling in or by dropwise addition in a diluent which may comprise excess alcohol. The initial diamide may be used in unpurified form in admixture with ammonium chloride as obtained by reaction of the corresponding dihalide with ammonia. In contrast with substituted amide starting materials the reaction is extremely selective toward producing the O-ester mono-amide substantially free of O,O-diester. The products exhibit insecticidal and acaricidal activity and can also be used to synthesize other insecticides and acaricides.

---

The present invention relates to a process for the selective preparation of N-unsubstituted (thiono)-(thiol)-phosphoric(phosphonic) acid O-ester mono-amides that can be used as insecticides and acarides, as well as intermediates for synthesizing other insecticidal and acaricidal substances.

It has been disclosed that (thio-)phosphoric(phosphonic) acid ester amides are obtained if (thio-)phosphoric (phosphonic) acid diester halides or monoester halides are reacted with ammonia. However, this process frequently suffers from the disadvantage that the particular monohalide required as a starting material is not obtainable in sufficient yield or purity or does not possess sufficient stability. Some of the amide esters in question can therefore be obtained either not at all or only in low yields or low degrees of purity, by this process. The usability of the process is therefore restricted. (See Houben-Weyl, volume XII/2, page 416 and page 760, and volume XII/1, page 529.) It has also been disclosed that amide esters of benzene-phosphonic acid are obtained if benzene phosphonic acid diamide mixed with an alcohol is heated for a prolonged period under reflux (see Journal of Org. Chem. 22 (1957), 265–267). This process suffers from the disadvantage that long reaction times, and the use of extreme temperatures, are necessary for carrying out the reaction. Thus, for example, a reaction of 22 hours under reflux conditions (100° C.) is necessary for the preparation of benzenephosphonic acid propyl ester amide. Shorter reaction times clearly lead to lower yields (see footnote (11) of the above-mentioned literature reference). A further disadvantage of this process is that it is not generally applicable to all desired (thio-) phosphoric acid ester diamides or (thio)-phosphonic acid diamides. If, for example, S-methylthiolo-phosphoric acid ester diamide is boiled for 24 hours in ethanol solution under reflux, unreacted starting material can be recovered almost quantitatively, as shown in Comparison Example 33 herein below. The applicability of the process is evidently restricted to benzene phosphonic acid derivatives.

The present invention provides a process for the preparation of an N-unsubstituted phosphoric or phosphonic acid O-ester mono-amide, or the corresponding thiono, thiol or thionothiol O-ester mono-amide, which comprises contacting at a temperature of about −10 to 70° C. the corresponding N-substituted phosphoric or phosphonic acid diamide with at least an equivalent amount of an alcohol in the presence of an approximately equivalent amount of a strong mineral acid.

Desirably the N-unsubstituted phosphoric or phosphonic acid O-ester mono-amide product has the formula

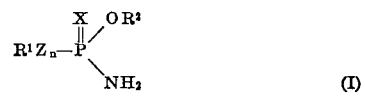
(I)

and is obtained from the corresponding N-unsubstituted phosphoric or phosphonic acid diamide of the formula

(II)

by reacting with an alcohol of the general formula

 (III)

in the presence of an equivalent amount of hydrogen chloride or of another strong acid at a temperature of from −10° to +70° C. in which $R^1$ is an alkyl, alkenyl, alkoxyalkyl, cycloalkyl, aryl or aralkyl radical, $R^2$ is an alkyl radical, the alkyl or alkenyl moieties of $R^1$ and $R^2$ having up to 6 carbon atoms, X and Z each is independently oxygen or sulfur, and n is 0 or 1.

Preferably, in the above formulas, $R^1$ is a lower alkyl or alkenyl of up to 4 carbon atoms, aryl or aralkyl radical, which radical preferably carries one or more substituents selected from halogen, nitro, alkyl, alkoxy, alkoxycarbonyl, aryl and alkylmercapto radicals; and $R^2$ is a straight-chain or branched lower alkyl radical with 1 to 3 carbon atoms which may be substituted by halogen or alkoxy.

It is surprising that under these reaction conditions the desired end products can be obtained rapidly, simply and in good purity. A particularly unexpected feature is the high selectivity with which, in the reaction according to the invention, only one of the two amide groups present in the starting material is replaced by an alkoxy radical, since when using the chemically similar and thus presumably comparable N-alkyl-substituted diamides of (thio-)phosphoric acid monoesters or (thio-)phosphonic acids instead of the N-unsubstituted diamides, this selectivity is not exhibited; rather, both amide groups simultaneously undergo replacement as shown in Comparison Example 34 and 35 hereinbelow.

Journal of Organic Chemistry 22 (1957), pages 265–267, discloses that the treatment of an ethanolic solution of benzene-phosphonic acid diamide with hydrogen chloride leads to splitting of the P—N bond and to the formation of ammonium chloride, but it is not apparent that at the same time a replacement of one amide group by one ethoxy radical took place.

The process according to the invention possesses a number of advantages, vis. its general applicability and its simplicity of technical execution. A further advantage is the ready availability of the diamides required as starting materials. Further advantages are the good quality and yield of the desired end products obtainable in accordance with the process of the invention.

If S-methylthiolophosphoric acid ester diamide and methanol are used as the starting materials, the course of the reaction can be represented by the following equation:

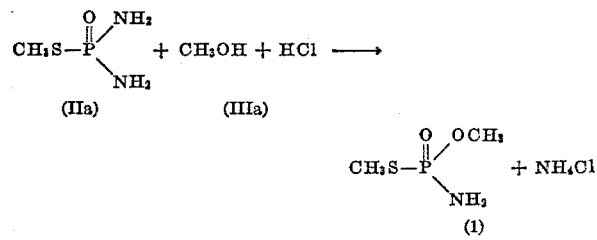

The following may be mentioned as examples of (thio-) phosphoric acid ester diamides, (thio-)phosphonic acid diamides or alcohols which can be used in the process according to this invention: O-methyl-phosphoric acid ester diamide, O-ethyl-phosphoric acid ester diamide, O-methoxyethyl-phosphoric acid ester diamide, O-ethoxyethyl-phosphoric acid ester diamide, O-chloroethyl-phosphoric acid ester diamide, O-bromoethyl-phosphoric acid ester diamide, O-propyl-phosphoric acid ester diamide, O-isopropyl-phosphoric acid ester diamide, O-butyl-phosphoric acid ester diamide, S-methyl-thiolphosphoric acid diamide, O-cyclohexyl-phosphoric acid ester diamide, O-benzylphosphoric acid ester diamide, O-dichlorovinyl-phosphoric acid ester diamide, S-methyl-thiophosphoric acid ester diamide, S-ethyl-thiolphosphoric acid ester diamide, S-propyl-thiolphosphoric acid ester diamide, S-butyl-thiolphosphoric acid ester diamide, O-phenyl-phosphoric acid ester diamide, O-(4-chlorophenyl)-phosphoric acid ester diamide, O-(2,4-dichlorophenyl)-phosphoric acid ester diamide, O-(3,4-dichlorophenyl)-phosphoric acid ester diamide, O-(4-bromo-phenyl)-phosphoric acid ester diamide, O-(2-chloro-4-bromo-phenyl)-phosphoric acid ester diamide, O-(2-ethoxycarbonyl-phenyl)-phosphoric acid ester diamide, O-(2 - isopropoxycarbonylphenyl) phosphoric acid ester diamide, O-(4 - methylmercaptophenyl) phosphoric acid ester diamide, O-(3-methyl-4-methyl-mercapto-phenyl)-phosphoric acid ester diamide, O-(4-nitro-phenyl)-phosphoric acid ester diamide, O-(3-methyl-4-nitrophenyl)-phosphoric acid ester diamide, O-(4-tert.-butyl-phenyl)-phosphoric acid ester diamide, O-(2 - chloro-4-tert.-butyl-phenyl)-phosphoric acid ester diamide, S-phenyl-thiol-phosphoric acid ester diamide, S-(4-chlorophenyl)-thiol-phosphoric acid ester diamide, S - (4-ethoxypheny)-thiol-phosphoric acid ester diamide, methanephosphonic acid diamide, ethanephosphonic acid diamide, benzylphosphonic acid diamide, benzenephosphonic acid diamide, p-chlorobenzenephosphonic acid diamide and the corresponding thiono analogues, as well as the following hydroxyalkanes: methanol, ethanol, propanol, isopropanol, butanol, sec.-butanol, pentanol, hexanol, chloroethanol, bromoethanol, fluoroethanol, dichloroisopropanol, methoxyethanol and ethoxyethanol.

In general, an excess of the alcohol (III) employed may be used as the diluent, but any inert organic solvent can also be used. Preferred solvents are ethers, such as diethyl ether, dibutyl ether and dioxane, carboxylic acid esters, such as methyl acetate and ethyl acetate, and acetonitrile.

The reaction temperatures can be varied over a wide range. In general, the reaction is carried out at about −10° to +70° C., preferably about −10° to +20° C.

In carrying out the process according to the invention, approximately equimolar amounts of the starting materials are generally employed; these are mixed with the diluent, or an excess of the alcohol (III) is used from the start as the diluent, and an equimolar amount of hydrogen chloride is added to the mixture, with external cooling, either by passing it in as a gas or by adding it dropwise in the form of a solution in the hydroxyalkane in question.

The mixture is stirred for some time longer: half an hour to 2 hours at 0° to 20° C. for phosphoric acid or phosphoric acid derivatives, or 1 to 5 hours at 20° C. or 30 to 60 minutes at 70° C. for thionophosphoric acid or thionophosphonic acid derivatives, and the reaction product is isolated by removing the salt and the solvent. If purification is desired, this can be effected by the customary methods such as washing, recrystallization or distillation, depending on the properties of the reaction product in question.

Instead of the hydrogen chloride employed, other strong mineral acids such as sulfuric acid, can in principle also be employed in equivalent amounts but better results are in general achieved with hydrogen chloride.

According to a particular embodiment, the phosphoric acid ester diamides or phosphonic acid diamides are employed in the reaction in the form of their mixtures with ammonium chloride. In the preparation of the diamides from the corresponding dichlorides, such mixtures are frequently first obtained, after reaction with ammonia, in a simple manner by filtration.

Since the presence of ammonium chloride does not impair the course of the process according to the invention, the separation of the salt from the starting material, which at times requires much effort, can be omitted, and this provides a further advantage. The effecting of the reaction and the working-up in other respects take place as indicated above.

The compounds obtainable in accordance with the process of the invention are valuable insecticides and acaricides. They are disclosed in German Pat. No. 1,210,835; U.S. Pat. No. 3,019,250; German Pat. No. 1,246,730; Belgian Pat. No. 724,681; German published specification DOS 1,668,094; and Belgian Pat. No. 737,117.

The compounds can also be used as intermediates in making other insecticides and acaricides.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistance, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones, (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.)

and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/ or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquids, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis and products of the present invention is illustrated, without limitation, by the following examples:

EXAMPLE 1

37.9 g. (0.3 mole) of S-methyl-thiolphosphoric acid ester diamide of melting point 125–126° C. are suspended in 120 ml. of methanol. A solution of hydrochloric acid in methanol, containing 0.3 mole of hydrogen chloride, is added dropwise thereto at —5° to 0° C., while stirring and cooling externally, and the reaction mixture is stirred for a further hour at 0° C. The mixture is neutralized with a little ammonia gas and the bulk of the ammonium chloride formed is removed by filtration. The filtrate is freed of the solvent *in vacuo* and the residue is taken up in 60 ml. of ethyl acetate. The cloudy solution is treated with a little activated charcoal and clarified by filtration. The O,S-dimethylphosphoric acid ester amide is obtained in a crystalline form by adding 60 ml. of ligroin. Yield: 30.0 g. of colorless crystals of melting point 39–40° C. (71% of theory).

EXAMPLE 2

In the same manner as Example 1, 37.9 g. (0.3 mole) of S-methyl-thiolphosphoric acid ester diamide, suspended in 120 ml. of ethanol, are treated with a solution of hydrochloric acid in ethanol, containing 0.3 mole of hydrogen chloride. After removing the salt and the solvent as described in Example 1, the residue is taken up in 150 ml. of ethyl acetate. The cloudy solution is treated with 3 g. of activated charcoal at 40° C. and filtered off whilst warm. The crystalization, which starts on cooling the filtrate, is completed by adding 250 ml. of ligroin.

35.8 g. (colorless needles) of O-ethyl-S-methyl-thiolphosphoric acid ester amide are obtained.

Melting point 67–69° C. (77% of theory).

EXAMPLE 3

O-n-propyl-S-methylthiolphosphoric acid ester amide (melting point 42° C.) is obtained in a manner analogous to that described above.

EXAMPLE 4

11.0 g. (0.3 mole) of hydrogen chloride are passed into a mixture of 37.9 g. (0.3 mole) of S-methyl-thiolphosphoric acid ester diamide, 24.5 g. (0.33 mole) of butanol and 100 ml. of ethyl acetate at 0°–10° C., while stirring and cooling externally, the reaction mixture is stirred for a further 2 hours at 25° C. and is neutralized with a little gaseous ammonia. The salt is filtered off and the filtrate is treated with activated charcoal and after filtration is further washed twice with 30 ml. of water each time. After drying and removing the solvent *in vacuo*, 36.2 g. of O-n-butyl-S-methylthiolphosphoric acid ester amide remain in the form of a colorless oil of refractive index $n_D^{21}$ 1.4812 (66% of theory).

EXAMPLE 5

The same general procedure described in Example 4 is followed, using glycol monoethyl ether. Because of the good solubility of the reaction product in water, the washing with water is dispensed with. After stripping off the solvent, the product is obtained in 68% yield as an oil which crystallizes throughout. The O-(ethoxyethyl)-S-methyl-thiolphosphoric acid ester amide has a melting point of 57–58° C. after recrystallization from chloroform-ligroin.

EXAMPLE 6

(Special embodiment)

The mixture of 1 mole of S-methyl-thiolphosphoric acid ester diamide and 2 moles of ammonium chloride (total amount 233 g.) obtained by simple filtration after reaction in chloroform in accordance with the equation

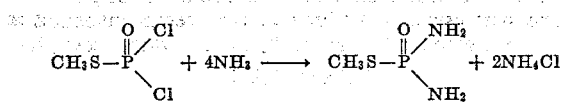

is suspended in 500 ml. of methanol. 36.5 g. (1 mole) of hydrogen chloride is passed into this mixture over the course of 45 minutes at −5° to 0° C. while stirring and cooling externally, and the reaction mixture is stirred for a further hour at 0° to 5° C. The batch is neutralized by passing in a little gaseous ammonia and is freed of the salt by filtration. The solid filter residue is further rinsed three times with 80 ml. of $CH_3OH$ at a time. The collected filtrates are freed of the solvent in vacuo at 40° C. bath temperature and the residue is taken up in 400 ml. of ethyl acetate. The solution is clarified by treatment with activated charcoal at 40° C. and filtration and is then freed of the solvent in vacuo. 120.6 g. of a colorless clear oil remain and, after seeding, this oil crystallizes throughout to give a hard product consisting of crystals of melting point 38–40° C. The yield of O,S-dimethyl-thiolphosphoric acid ester amide is 85.5% of theory.

EXAMPLE 7

11 g. (0.3 mole) of hydrogen chloride are passed into a solution of 69 g. (0.3 mole) of O-(4-tert.-butylphenyl)-phosphoric acid ester diamide of melting point 139° C. in 300 ml. of methanol over the course of approximately 20 minutes at −5° to 0° C., while stirring and cooling externally, and the reaction mixture is stirred for a further hour at 0° to 50° C. After neutralization with a little ammonia gas, the salt is filtered off and the solvent is removed in vacuo. The residue is taken up in 200 ml. of benzene, twice washed with 40 ml. of water each time and caused to crystallize, after drying with sodium sulfate, by adding 200 ml. of ligroin. 55 g. (75.5% of theory) of colorless crystals of melting point 101–102° C. of O-methyl-O-(4-tert.-butylphenyl)-phosphoric acid diester amide are obtained.

Using, in each case, the appropriate starting materials, the following compounds are obtained in a manner fundamentally similar to that of Example 7:

EXAMPLE 8

O-methyl-O-(2,4-dichlorophenyl)-phosphoric acid diester amide; melting point 54° C.

EXAMPLE 9

O-ethyl-O-(2,4-dichlorophenyl)-phosphoric acid diester amide; melting point 67–68° C.

EXAMPLE 10

O-methyl - O - (2 - isopropoxycarbonylphenyl)-phosphoric acid diester amide; melting point 76° C.

EXAMPLE 11

O-ethyl-O-(2-isopropoxycarbonylphenyl) - phosphoric acid diester amide; melting point 74–75° C.

EXAMPLE 12

O-isopropyl - O - (2-isopropoxycarbonylphenyl)-phosphoric acid diester amide; melting point 79–80° C.

EXAMPLE 13

O-(2-chloroethyl)-O-(2′ - isopropoxycarbonylphenyl)-phosphoric acid diester amide; melting point 108° C.

EXAMPLE 14

O-methyl-benzenephosphonic acid ester amide; melting point 111–112° C.

EXAMPLE 15

O-ethyl-benzenephosphonic acid ester amide; melting point 134° C.

EXAMPLE 16

O-n-propyl-benzenephosphonic acid ester amide; melting point 137–138° C.

EXAMPLE 17

O-(2-chloroethyl)-benzenephosphonic acid ester amide; melting point 107–108° C.

EXAMPLE 18

A solution of hydrochloric acid in methanol, containing 0.2 mole of hydrogen chloride, is added dropwise to a solution of 38.2 g. (0.2 mole) of O-dichlorovinylphosphoric acid ester diamide of melting point 94° C. in 150 ml. of methanol at −5° to 0° C., while stirring and cooling externally, and the reaction mixture is stirred for a further 2 hours at 0°–5° C. The mixture is just neutralized with a little gaseous ammonia, the salt is removed by filtration and the solvent is stripped off in vacuo. The residue is taken up in 150 ml. of benzene and the solution is clarified by filtration and washed once with 15 ml. of water. After drying and removing the solvent, 32.0 g. (77.7% of theory) of O-methyl-O-(2,2-dichlorovinyl)phosphoric acid diester amide remain in the form of a colorless oil of refractive index $n_D^{25}$ 1.4844.

EXAMPLE 19

The same procedure as described in Example 18 leads to O-ethyl-O-(2,2-dichlorovinyl)-phosphoric acid diester amide, refractive index $n_D^{22}$ 1.4831, if ethanol is used.

EXAMPLE 20

A solution of hydrochloric acid in methanol, containing 0.2 mole of hydrogen chloride is added dropwise, while stirring, to a solution of 28.0 g. (0.2 mole) of O-ethyl-thionophosphoric acid diamide ($n_D^{24}$=1.5436) in 80 ml. of methanol and the reaction mixture is stirred for a further hour at 65° C.

After neutralization with gaseous ammonia, the salt is filtered off and the filtrate is freed of the solvent in vacuo. The residue is taken up in 100 ml. of methylene chloride. The solution is washed with 30 ml. of water and dried and the solvent is distilled off in vacuo. After vacuum distillation, the residue yields 23.3 g. of a colorless liquid of boiling point 85° C./2 mm. Hg and of refractive index $n_D^{21}$ 1.4932. The yield is 75% of theory of O-methyl-O-ethyl-thionophosphoric acid diester amide.

The same compound is also obtained in the converse manner by starting from O-methyl-thionophosphoric acid diamide and a solution of hydrochloric acid in ethanol and in other respects continuing the procedure as described.

If in each case the appropriate starting materials are used, the following compounds are obtained in a manner fundamentally similar to that of Example 20:

EXAMPLE 21

O-methyl-methane-thionophosphonic acid ester amide; boiling point 85° C./2 mm. Hg; refractive index $n_D^{22}$=1.5305.

EXAMPLE 22

O-methyl-ethane - thionophosphonic acid ester amide; boiling point 113° C./3 mm. Hg; refractive index $n_D^{26}$=1.5230.

EXAMPLE 23

O-ethyl-ethane-thionophosphonic acid ester amide; boiling point 94° C./2 mm. Hg; refractive index $n_D^{24}$=1.5086.

EXAMPLE 24

O,S-dimethylthionothiolphosphonic acid diester amide; boiling point 108° C./3 mm. Hg; refractive index $n_D^{24} = 1.5820$.

EXAMPLE 25

O-methyl-benzene-thionophosphonic acid ester amide; refractive index $n_D^{23} = 1.6008$.

EXAMPLE 26

O-methyl - O - phenyl - thionophosphoric acid diester amide; refractive index $n_D^{23} = 1.5662$.

EXAMPLE 27

O-methyl-S-benzyl - thionothiolphosphoric acid diester amide; refractive index $n_D^{21} = 1.6132$.

EXAMPLE 28

O-methyl-S-phenyl - thionothiolphosphoric acid diester amide; refractive index $n_D^{21} = 1.6230$.

EXAMPLE 29

A solution of hydrochloric acid in methanol containing 0.1 mole of hydrogen chloride is added dropwise to a suspension of 27.4 g. (0.1 mole) of O-(2-isopropoxycarbonylphenyl)-thionophosphoric acid ester diamide, of melting point 108° C., in 54 ml. of methanol at 25–30° C., while stirring and applying slight external cooling, and the reaction mixture is stirred for a further 2 hours at 25° C. The batch is neutralized with a little gaseous ammonia and the salt is filtered off. After removing the solvent in vacuo, the residue is taken up in 50 ml. of benzene and twice washed with 30 ml. of water each time. The solution is carefully dried, treated with ligroin and cooled. In this way, 20.2 g. of colorless crystals of melting point 43–45° C. (70% of theory) of O-methyl-O-(2-isopropoxycarbonylphenyl) - thionophosphoric acid diester amide are obtained.

EXAMPLE 30

In the same way as that described in Example 29, using ethanol and a solution of hydrochloric acid in ethanol, and employing similar working-up, colorless crystals, of melting point 58–59° C., of O-ethyl-O-(2-isopropoxycarbonylphenyl)-thionophosphoric acid diester amide are obtained in 76% yield.

EXAMPLE 31

(Use of sulfuric acid)

10.3 g. of 95% strength sulfuric acid (0.1 mole) are added dropwise while stirring to a solution of 25.2 g. (0.2 mole) of O-methyl-thionophosphoric acid diamide, of melting point 55° C., in 100 ml. of methanol, in the course of which the temperature of the reaction mixture rises from 8° C. to approximately 51° C. The mixture is stirred for a further hour at 65° C., cooled and neutralized by passing in a little gaseous ammonia. The salt is filtered off and the filtrate is freed of the solvent in vacuo. The residue is taken up in 100 ml. of methylene chloride and the solution is washed with 20 ml. of water, dried and again freed of the solvent. After distillation in vacuo, the residue yields 19.0 g. of a colorless liquid of boiling point 83° C./2 mm. Hg and of refractive index $n_D^{22}$ 1.5022. The yield is 67% of theory of O,O-dimethyl-thionophosphoric acid diester amide.

EXAMPLE 32

A solution of 20.1 g. (0.55 mole) of hydrogen chloride in 88 g. of methanol is added dropwise, with stirring, to a mixture of 63.1 g. (0.5 mole) of O-methyl-thionophosphoric acid ester diamide and 150 ml. of methanol at an internal temperature of 20 to 30° C., while stirring. The exothermic after-reaction is allowed to occur and the mixture is heated for a period of one hour at 60° C.

After cooling, the batch is neutralized with a little gaseous ammonia and the salt is filtered off. The filtrate is freed of the solvent under reduced pressure and the residue is taken up in 200 ml. of dichloromethane. After filtering off the salt, the solution is shaken with 30 ml. of water with the addition of a little sodium bicarbonate solution.

After drying, and removing the solvent under reduced pressure, 65.5 g. (92.8% of theory) of O,O-dimethyl-thionophosphoric acid diester amide are obtained as a colorless liquid of refractive index $n_D^{21.5}$ 1.5011.

The Comparison Example 33 which follows shows that the teaching of the prior art is only of limited applicability.

COMPARISON EXAMPLE 33

Analogously to the instructions for the preparation of O-ethyl-benzene-phosphonic acid ester amide in the Journal of Organic Chemistry 22 (1957) on page 266, 25.2 g. (0.2 mole) of S-methyl-thiolphosphoric acid ester diamide in 250 ml. of ethanol were boiled for 24 hours under reflux, and cooled. Thin layer chromatography on silica gel, using benzenemethanol (8:2) as the running agent, already showed that no change in the starting material had taken place. The unchanged starting material could be recovered in 92% yield by concentrating the solution and adding petroleum ether and was perfectly identifiable from its melting point and chromatogram.

The following Comparison Examples 34 and 35 show that the process according to the present invention wherein only one of the two amide groups present in the starting material is replaced by an alkoxy radical, is highly selective in contrast with the unselective replacement when using starting materials differing only in that the diamides are N-substituted.

COMPARISON EXAMPLE 34

12.4 g. (0.1 mole) of O-ethyl-phosphoric acid ester diamide of melting point 89° C. were dissolved in 100 ml. of methanol and a solution of hydrochloric acid in methanol was gradually added at 0–5° C., while stirring and cooling externally. The addition was carried out in 8 steps each of 0.025 mole of hydrogen chloride, so that finally a total of 0.2 mole of hydrogen chloride had been added. After each step, 2 mm.³ were withdrawn from the reaction mixture by means of a micro-pipette and these samples were continuously applied to the starting points of a thin layer chromatography plate (silica gel F 254). Chromatography was carried out with benzene-methanol (8:2) as the running agent. The spots of substance were rendered visible as follows: (1) spraying a 2% strength solution of 4-p-nitrobenzylpyridine in acetone, (2) heating the plate to 140° for 5 minutes and (3) spraying the hot plate with a 10% strength solution of tetraethylenepentamine in acetone.

Evaluation of the chromatogram showed the following: As the hydrogen chloride is progressively added, the desired O-ethyl-O-methyl-phosphoric acid diester amide is increasingly produced until 1 mole of hydrogen chloride has been added per mole of starting product, without even a trace of O-ethyl-O,O-dimethyl-phosphoric acid ester being produced. The latter is only produced gradually on further (excess) addition of hydrogen chloride, as a result of a further reaction, but is produced comparatively much more slowly. After addition of a total of 2 moles of hydrogen chloride per mole of starting material and after 4 hours' after-reaction at 25° C., the ratio of O-ethyl-O-methyl-phosphoric acid diester amide to O-ethyl-O,O-dimethyl-phosphoric acid ester is still about 3:1 (estimated from the size of the spot).

COMPARISON EXAMPLE 35

15.2 g. (0.1 mole) of O-ethyl-N,N'-dimethyl-phosphoric acid ester diamide were dissolved in 100 ml. of methanol.

The subsequent procedure was carried out under the same conditions as described in Comparison Example 34. Evaluation of the chromatogram showed the following: After addition of the first portion of hydrogen chloride (0.25 mole per mole of starting material) both O-ethyl-O-methyl-N-methyl-phosphoric acid diester amide and O-ethyl-O,O-dimethyl-phosphoric acid ester are already formed. Their amounts both increase on further addition, but the latter compound predominates more and more. After addition of a total of 2 moles of hydrogen chloride per mole of starting material and after 4 hours' after-reaction at 25°, only O-ethyl-O,O-dimethyl-phosphoric acid ester is present, i.e. amide is no longer present.

It will be appreciated that the instant specification and examples are set forth by way of illustration and not limitation and that various modifications and changes may be made without departing from the spirit and scope of the present invention.

What is claimed is:

1. A process for the preparation of an N-unsubstituted phosphoric or phosphonic acid O-ester mono-amide, or the corresponding thiono, thiol or thionothiol O-ester mono-amide, which comprises contacting at a temperature of about −10 to 70° C. the corresponding N-unsubstituted phosphoric or phosphonic acid diamide with at least an equivalent amount of an alcohol in the presence of an approximately equivalent amount of a strong mineral acid.

2. A process according to claim 1 in which the strong acid is hydrogen chloride.

3. A process according to claim 2 in which the hydrogen chloride is added to the reaction mixture by passing it in as a gas or by adding it dropwise in the form of a solution in the alcohol.

4. A process according to claim 1 in which the reaction is effected at about −10° to +20° C.

5. A process according to claim 1 in which the diamide, alcohol and strong acid are used in substantially equimolar amounts.

6. A process according to claim 1 in which the reaction is effected in the presence of an inert organic solvent.

7. A process according to claim 1 in which the alcohol is present in excess, the excess alcohol serving as a diluent for the reaction.

8. A process according to claim 1 in which the diamide is used in unpurified form in admixture with ammonium chloride as obtained by reaction of the corresponding dihalide with ammonia.

9. A process according to claim 1 in which the O-ester mono-amide has the formula

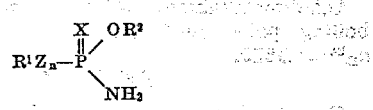

and the initial diamide has the formula

in which $R^1$ is an alkyl, alkenyl, alkoxyalkyl, cycloalkyl, aryl or aralkyl radical, which radical may carry at least one substituent selected from halogen, nitro, alkyl, alkoxy, alkoxycarbonyl, aryl and alkylmercapto radicals, $R^2$ is an alkyl radical, which may be substituted by halogen or alkoxy, the alkyl or alkenyl moieties of $R^1$ and $R^2$ having up to 6 carbon atoms, X and Z each is independently oxygen or sulfur, and $n$ is 0 or 1.

10. A process according to claim 9 in which $R^1$ is a lower alkyl or alkenyl of up to 4 carbon atoms, aryl or aralkyl radical, which radical carries at least one substituent selected from halogen, nitro, alkyl, alkoxy, alkoxycarbonyl, aryl and alkylmercapto radicals; and $R^2$ is a straight-chain or branched lower alkyl radical with 1 to 3 carbon atoms which may be substituted by halogen or alkoxy.

References Cited

UNITED STATES PATENTS 3,185,721   5/1965   Schrader _____ 260—971

OTHER REFERENCES

Smith et al., Journal of Organic Chemistry, vol. 22 (1957), pp. 265–267.

LORRAINE A. WEINBERGER, Primary Examiner

R. L. RAYMOND, Assistant Examiner

U.S. Cl. X.R.

260—941, 949, 951, 954, 956, 957, 958, 959

UNITED STATES PATENT OFFICE
CERTIFICATE OF CORRECTION

Patent No. 3,813,457　　　　　　Dated　May 28, 1974

Inventor(s)　Reimer Colln

It is certified that error appears in the above-identified patent and that said Letters Patent are hereby corrected as shown below:

Col. 1, line 40, correct spelling of "acaricides".

Col. 2, line 9, cancel "N-substituted" and substitute therefor

-- N-unsubstituted --.

Col. 3, line 26, cancel "S-methyl-thiolphosphoric acid"

and substitute therefor

-- O-hexyl-phosphoric acid ester --.

Col. 3, line 28, change "thiophosphoric" to -- thiolphosphoric --.

Signed and sealed this 11th day of February 1975.

(SEAL)
Attest:

RUTH C. MASON
Attesting Officer

C. MARSHALL DANN
Commissioner of Patents
and Trademarks